US008625550B2

(12) United States Patent
Choi

(10) Patent No.: US 8,625,550 B2
(45) Date of Patent: Jan. 7, 2014

(54) MOBILE COMMUNICATION TERMINAL AND METHOD FOR TRANSMISSION OF IMAGE IN MOBILE MESSENGER SERVICE

(75) Inventor: Woo Hyuk Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 685 days.

(21) Appl. No.: 11/788,063

(22) Filed: Apr. 19, 2007

(65) Prior Publication Data

US 2007/0248070 A1  Oct. 25, 2007

(30) Foreign Application Priority Data

Apr. 24, 2006  (KR) .................. 10-2006-0036633

(51) Int. Cl.
*H04W 16/26* (2009.01)
(52) U.S. Cl.
USPC ........................................ 370/338; 455/466
(58) Field of Classification Search
USPC ........ 455/550.1, 466, 522; 370/338, 313, 437
See application file for complete search history.

(56) References Cited

U.S. PATENT DOCUMENTS

| 6,011,869 | A  | * | 1/2000  | Ohta et al. ..................... 382/233 |
| 6,047,194 | A  |   | 4/2000  | Andersson |
| 6,526,100 | B1 | * | 2/2003  | Kalliokulju et al. ..... 375/240.26 |
| 6,981,223 | B2 | * | 12/2005 | Becker et al. .................. 715/753 |
| 6,990,352 | B2 | * | 1/2006  | Pyhalammi et al. .......... 455/466 |
| 7,016,548 | B2 | * | 3/2006  | Latva-Aho ..................... 382/251 |
| 7,158,251 | B2 | * | 1/2007  | Schinner ....................... 358/1.15 |
| 7,310,514 | B2 | * | 12/2007 | Shinohara .................. 455/412.2 |
| 7,433,344 | B2 |   | 10/2008 | Lee et al. |
| 7,821,978 | B2 | * | 10/2010 | Staack ........................... 370/312 |
| 7,961,663 | B2 | * | 6/2011  | Lin ................................ 370/313 |

| 2002/0086672 | A1 | * | 7/2002  | McDowell et al. ........... 455/432 |
| 2002/0152266 | A1 | * | 10/2002 | Burfeind et al. .............. 709/203 |
| 2004/0002305 | A1 | * | 1/2004  | Byman-Kivivuori et al. ............ 455/41.2 |
| 2004/0029535 | A1 |   | 2/2004  | Chaki |
| 2004/0057449 | A1 |   | 3/2004  | Black |
| 2004/0070670 | A1 | * | 4/2004  | Foster ........................ 348/207.1 |
| 2005/0018826 | A1 | * | 1/2005  | Benco et al. ............. 379/202.01 |
| 2005/0078612 | A1 | * | 4/2005  | Lang .............................. 370/260 |
| 2005/0138123 | A1 | * | 6/2005  | Yun et al. ...................... 709/206 |
| 2005/0208962 | A1 | * | 9/2005  | Kim .......................... 455/550.1 |
| 2005/0213834 | A1 |   | 9/2005  | Bang |

(Continued)

FOREIGN PATENT DOCUMENTS

| EP | 1 331 786 A1  | 7/2003  |
| EP | 1 571 791 A2  | 9/2005  |
| JP | 2001-517911   | 10/2001 |
| JP | 2003-309668   | 10/2003 |
| JP | 2004-072652   | 3/2004  |
| JP | 2004-343544   | 12/2004 |
| JP | 2005-018423   | 1/2005  |
| JP | 2005-278151   | 10/2005 |
| KR | 10444565      | 8/2004  |
| KR | 1020050089690 | 9/2005  |
| KR | 100539953     | 12/2005 |
| KR | 102006013445  | 12/2006 |
| WO | WO 2006/022984 | 3/2006 |

OTHER PUBLICATIONS

ZDNet: HoneyQ v 1.5; Internet Citation, Nov. 6, 1997.

*Primary Examiner* — Kamran Afshar
*Assistant Examiner* — Khawar Iqbal
(74) *Attorney, Agent, or Firm* — The Farrell Law Firm, P.C.

(57) ABSTRACT

Provided are a mobile communication terminal and a method capable of transmitting an image during the execution of a mobile messenger service. A host terminal acquires image data in response to a request for image transmission and creates a first transmission packet of the image data. The first packet is sent to a client terminal through a packet data communication network at a specified period. Additionally, when receiving a second transmission packet of image data from the client terminal, the host terminal decodes and displays the received second packet.

17 Claims, 5 Drawing Sheets

(56) References Cited

U.S. PATENT DOCUMENTS

| | | |
|---|---|---|
| 2005/0220134 A1* | 10/2005 | Lin .............................. 370/437 |
| 2005/0243978 A1 | 11/2005 | Son et al. |
| 2006/0041627 A1 | 2/2006 | Tu |
| 2006/0270393 A1* | 11/2006 | Sheen et al. .................. 455/416 |
| 2008/0013471 A1* | 1/2008 | Kim .............................. 370/312 |
| 2008/0102801 A1* | 5/2008 | Lazaridis et al. .......... 455/414.1 |

\* cited by examiner

MOBILE COMMUNICATION TERMINAL AND METHOD FOR TRANSMISSION OF IMAGE IN MOBILE MESSENGER SERVICE

PRIORITY

This U.S. non-provisional application claims priority under 35 U.S.C. §119 to Korean Patent Application No. 2006-36633, which was filed in the Korean Intellectual Property Office on Apr. 24, 2006, the contents of which are incorporated herein by reference.

BACKGROUND OF THE INVENTION

1. Field of the Invention

The present invention relates generally to a mobile messenger service and, more particularly, to a mobile communication terminal and a method capable of transmitting an image during the execution of a mobile messenger service.

2. Description of the Related Art

With the remarkable growth of the telecommunication communication industry, Code Division Multiple Access (CDMA) communication system is continuously developing toward a multicasting multimedia communication that allows transmission of high-volume data, e.g., packet data, as well as traditional voice transmission.

The development of mobile communication technology and the increasing use of and dependence on mobile terminals, has led to the development of an increased number of various functions in addition to talk, such as character and image transmission. Additionally, many mobile terminals now provide an address book function that includes a personal directory, and a schedule manager.

Further to the enhanced functions available for the mobile terminals, a mobile messenger service has been recently introduced. The mobile messenger service is an instant messaging application that allows registered users to communicate in real time via text transmission over the mobile Internet. The mobile messenger service enables users to exchange memos, files and other data, and to participate in a real time chatting and group telephony.

Such a conventional mobile messenger service may, however, use only text messages for communication between users who take part in a chatting session. That is, the conventional mobile messenger service may fail to use image transmission.

To solve the above issue, an attempt to utilize RTP (Real-time Transport Protocol) or RTCP (Real-time Transport Control Protocol) for image transmission between mobile terminals is utilized in conventional systems. Such an attempt is not, however, practicable to the mobile messenger service since it requires the intervention of a server in the CDMA network system. A server-client system using a CDMA server not only increases complexity of the system, but also reduces transmission speed.

SUMMARY OF THE INVENTION

An aspect of the present invention is to provide a mobile communication terminal and a method capable of transmitting an image during execution of a mobile messenger service.

According to an exemplary embodiment of the present invention, a mobile communication terminal includes a control unit; an image acquisition unit obtaining image data under control of the control unit in response to a request for image transmission during execution of the mobile messenger service; an transmission packet creation unit creating a first transmission packet of the image data under control of the control unit; and a packet data communication network interface unit offering an interface with a packet data communication network and sending the first transmission packet of the image data to the packet data communication network at specified periods under control of the control unit.

In the terminal, the image acquisition unit may include a camera lens located at the front face of the terminal or configured to be adjustable in location or direction as if located at the front face of the terminal.

Furthermore, the transmission packet creation unit divides the image data into one-time transmittable segments and compresses the divided segments. Here, the first transmission packet of the image data preferably includes the divided and compressed image segments, an IP address of a sender, and an IP address of a receiver. The transmission packet creation unit preferably compresses the divided segments of the image data by using JPEG method.

Additionally, the first transmission packet of the image data preferably includes information about counterpart mobile communication terminal. Here, the packet data communication interface unit sends the first transmission packet to the counterpart mobile communication terminal through the packet data communication network. The specified period is preferably approximately one second.

The terminal preferably further includes an image decoder decoding a second transmission packet of image data the packet data communication interface unit receives during execution of the mobile messenger service; and a display unit displaying the decoded image data. In this case, the display unit includes a second image display section for displaying the second packet, a dialogue display section, and a message input section. The display unit further preferably includes a first image display section for displaying the first packet. Besides, the control unit preferably receives the decoded image data from the image decoder, determines the validity of the decoded image data, and controls the display unit to display a valid image only.

According to another exemplary embodiment of the present invention, a method for image transmission includes acquiring image data in response to a request for image transmission during execution of the mobile messenger service; creating a first transmission packet of the image data; and sending the first transmission packet of the image data to a packet data communication network at specified periods.

In this method, the creating of the first packet preferably includes dividing the image data into one-time transmittable segments, compressing the divided segments, and creating the first packet having the divided and compressed image segments, an IP address of a sender, and an IP address of a receiver. Here, the compressing of the segments is performed by JPEG method. Furthermore, the sending of the first packet is performed at intervals of approximately one second.

The method preferably further includes receiving a second transmission packet of image data from the packet data communication network during execution of the mobile messenger service; decoding the second transmission packet of the image data; and displaying the decoded image data. In this case, the displaying of the decoded image data includes displaying the second packet in a second image display section of a display unit also having a dialogue display section and a message input section. Here, the method further includes displaying the first packet in a first image display section separated from the second image display section. Additionally, the method may further includes determining the validity of the decoded image data, wherein the displaying of the decoded image data includes displaying a valid image only.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
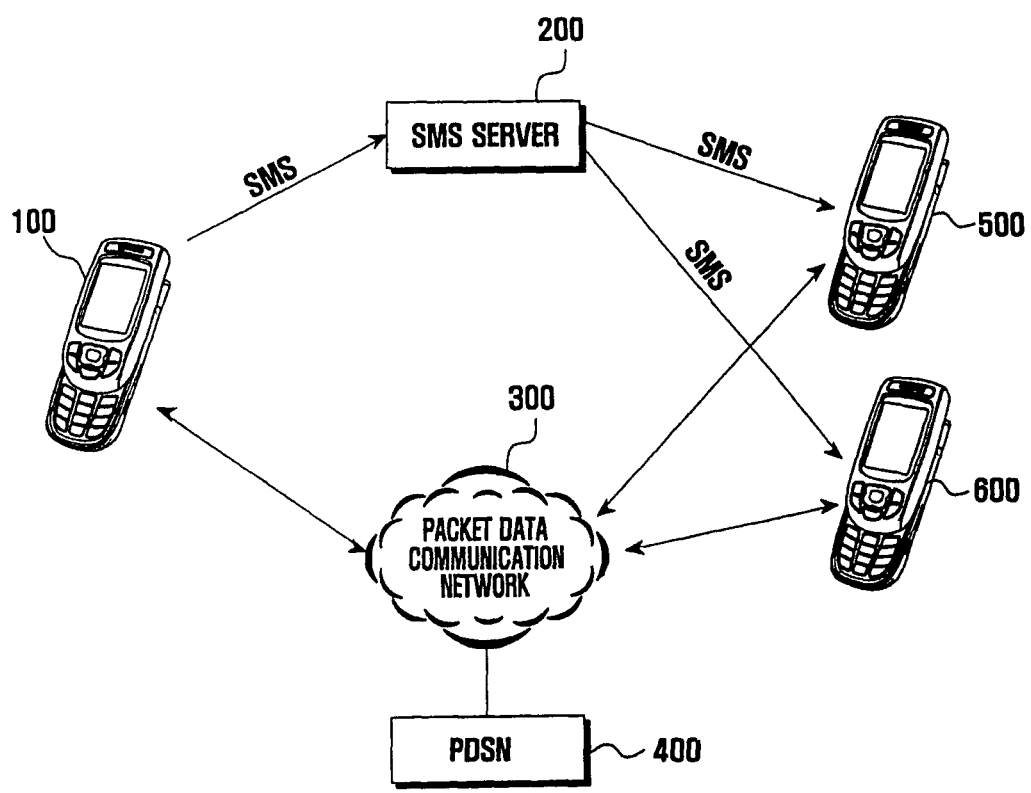
FIG. 1 is a schematic diagram showing a mobile communication system allowing the execution of a mobile messenger service to which the present invention is applied.

Exemplary, non-limiting embodiments of the present invention will now be described more fully hereinafter with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Well-known structures and processes are not described or illustrated in detail to avoid obscuring the essence of the present invention. Like reference numerals are used for like and corresponding parts of the various drawings.

FIG. 1 is a schematic diagram showing a mobile communication system allowing the execution of a mobile messenger service to which the present invention is applied. Referring to FIG. 1, a mobile messenger system, i.e. a mobile communication system that allows a mobile messenger service, includes mobile communication terminals (hereinafter, mobile terminals or terminals) 100, 500 and 600, a Short Message Service (SMS) server 200 (hereinafter, an SMS server), a packet data communication network 300, and a Packet Data Serving Node (PDSN) 400.

Each of the mobile terminals 100, 500 and 600 has a program suitable for a mobile messenger service. One terminal is a host terminal 100 that transmits an invitation message to conversation, and the other terminals are client terminals 500 and 600 that transmit an acceptance message to conversation in response to the invitation message.

The SMS server 200 sends SMS messages through a mobile communication network, such as a conventional CDMA network. Especially, the SMS server 200 transmits an invitation message of the host terminal 100 to the respective client terminals 500 and 600.

The packet data communication network 300 establishes a Point-to-Point Protocol (PPP) connection channel to perform a packet data communication.

The PDSN 400 is connected to the respective terminals 100, 500 and 600 through the packet data communication network 300. The PDSN 400 receives acceptance messages from the respective client terminals 500 and 600, and sends the acceptance messages to the host terminal 100. Furthermore, after initialization, the PDSN 400 provides a mobile messenger service, i.e. real-time information transmission, between the terminals 100, 500 and 600. For example, the PDSN 400 transmits a message of the host terminal 100 to the client terminals 500 and 600, and transmits a message of one client terminals 500 or 600 to the host terminal 100 and the other client terminal 500 or 600.

Figure 2:
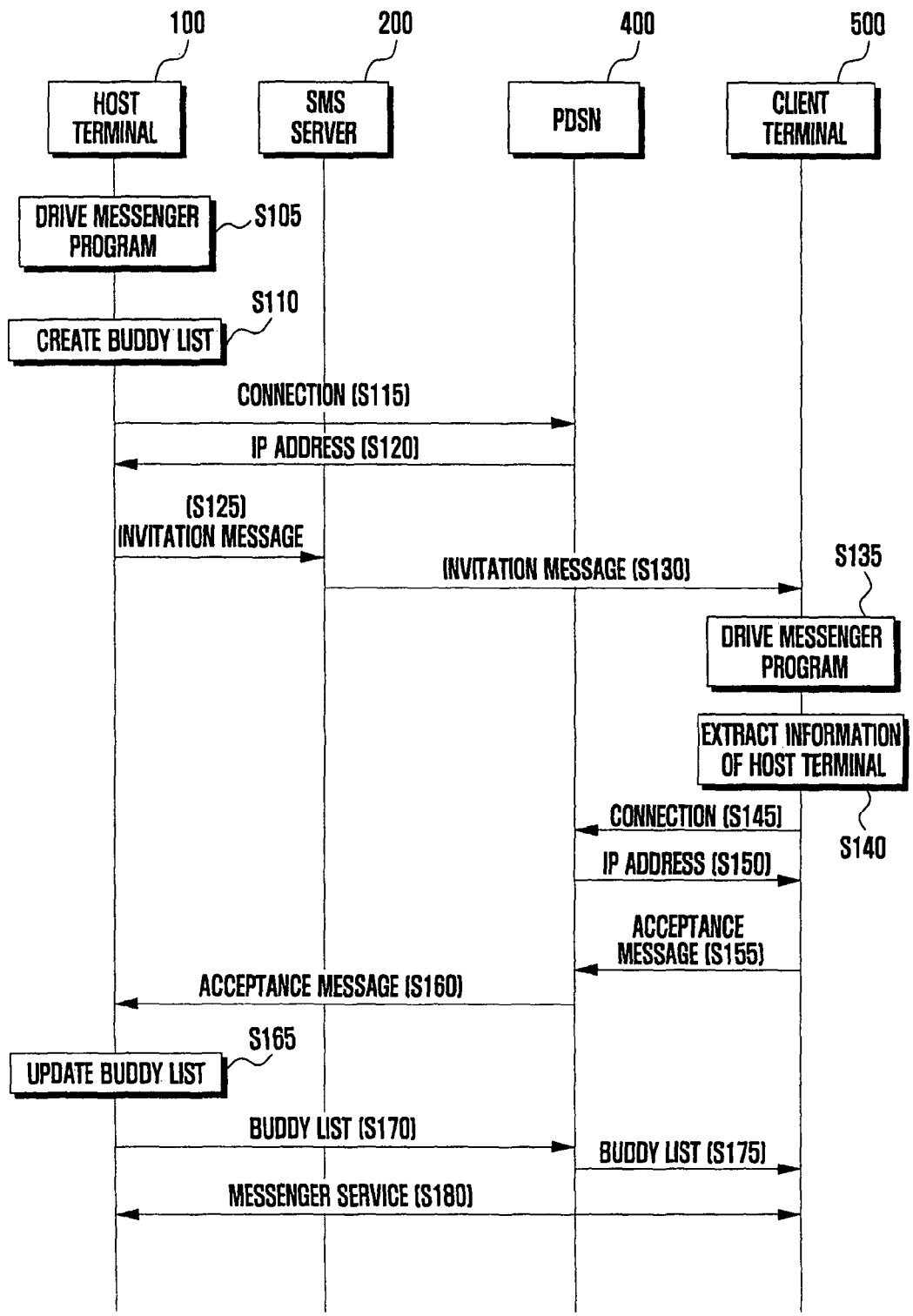
FIG. 2 is a ladder diagram showing an initialization procedure of a mobile messenger service executed in the system shown in FIG. 1.

FIG. 2 is a ladder diagram showing an initialization procedure of a mobile messenger service executed in the system shown in FIG. 1. Especially, FIG. 2 illustrates an example of initialization for a mobile messenger service between the host terminal 100 and the client terminal 500.

Referring to FIG. 2, the host terminal 100, keeping a normal operation mode for mobile communications, drives in Step 105 a mobile messenger program when receiving an input signal for the commencement of a mobile messenger service.

Next, in Step 110 the host terminal 100 creates a buddy list based on a user's selection, and in Step 115 makes a PPP connection with the PDSN 400. Then, in Step 120 the host terminal 100 receives an Internet Protocol (IP) address allocated thereto from the PDSN 400.

The buddy list is a series of persons to talk to via a mobile messenger service and is also called a conversation companion list. Preferably, the host terminal 100 creates a buddy list that includes someone selected among conversation expectants registered in the host terminal 100. Alternatively, the buddy list is created to include someone selected from among users available for a mobile messenger service, such users being recorded in an address book of the host terminal 100.

In Step 125 the host terminal 100 transmits an invitation message to respective terminals corresponding to conversation expectants in the buddy list. FIG. 2 provides an example of transmitting an invitation message to the client terminal 500. After a user of the client terminal 500 is registered in the buddy list in Step 110, the host terminal 100 sends the invitation message to the client terminal 500 in Steps 125 and 130. This transmission of the invitation message is made via the SMS server 200, and the IP address of the host terminal 100 received in Step 120 is included in the invitation message. In addition to the IP address, the invitation message may also include any other information about the host terminal 100 such as identification (ID), a port number, etc.

Receiving the invitation message, the client terminal 500 confirms that the received message is for a mobile messenger service, and in Step 135 drives a messenger program. Then, in Step 140, the client terminal 500 extracts information about the host terminal 100, such as an IP address, ID, a port number, etc.

Additionally, in Step 145 the client terminal 500 makes a PPP connection with the PDSN 400, and in Step 150 receives an IP address allocated thereto from the PDSN 400. Then, in Steps 155 and 160, being based on a user's selection, the client terminal 500 transmits an acceptance message to the host terminal 100 in response to the invitation message.

Since having already recognized the IP address of the host terminal 100 from the received invitation message, the client terminal 500 sends the acceptance message to the IP address of the host terminal 100 through the PDSN 400. When creating the acceptance message, the client terminal 500 assigns its own IP address to a sender address and the IP address of the host terminal 100 to a receiver address, respectively. The acceptance message preferably includes such IP addresses, protocol information, port number information, certification information, etc.

When the host terminal 100 receives the acceptance message from the client terminal 500, in Step 165 the host terminal 100 updates the buddy list so that information about only the client terminal 500 that sent the acceptance message may be included in the buddy list. That is to say, the host terminal 100 deletes a user of a client terminal that fails to transmit the acceptance message in response to the invitation message.

Next, in Steps 170 and 175 the host terminal 100 transmits the updated buddy list through the PDSN 400 to the client terminal 500 that sent the acceptance message.

Once the buddy list is held in common between conversation parties, a mobile messenger service is commenced in Step 180. That is, each terminal 100 and 500 makes a connection with the PDSN 400 by using the IP address of the counterpart, and therefore a mobile messenger service begins.

Figure 3:
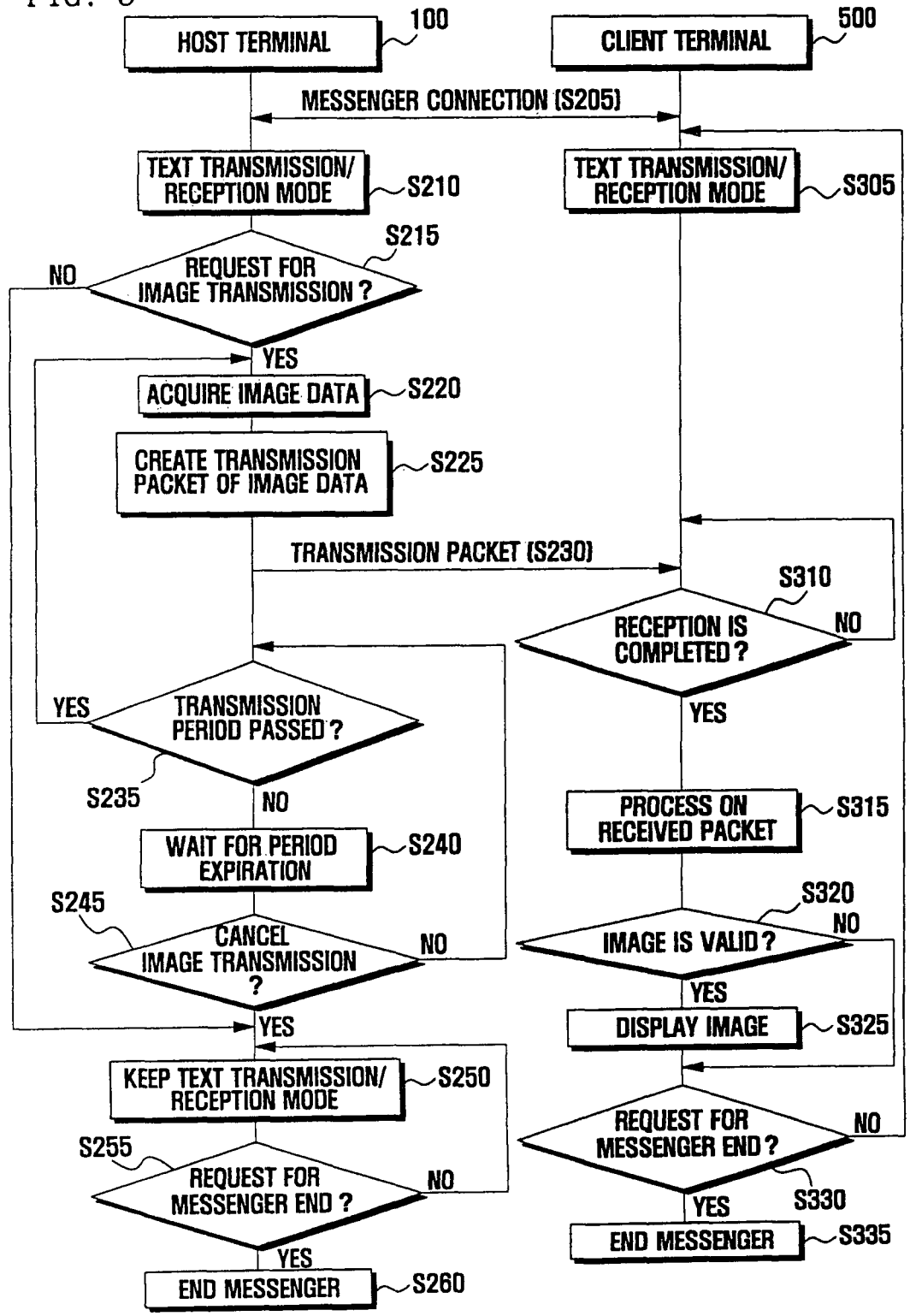
FIG. 3 is a flow chart showing a method for image transmission in a mobile messenger service in accordance with an exemplary embodiment of the present invention.

FIG. 3 is a flowchart showing a method for image transmission in a mobile messenger service in accordance with an exemplary embodiment of the present invention. Specifically, FIG. 3 shows an example of transmitting and receiving an image between the host terminal 100 and the client terminal 500 using a mobile messenger service after the initialization for a mobile messenger service is completed as shown in FIG. 2. Especially, FIG. 3 provides an example of the host terminal 100 transmitting an image and the client terminal 500 receiving the transmitted image.

Referring to FIG. 3, when a messenger connection is established between the host terminal 100 and the client terminal 500 in step S205, both the host terminal 100 and the client terminal 500 operate, respectively, in a text transmission/reception mode in Steps 210 and 305.

When receiving a request for image transmission in step S215, the host terminal 100 acquires an image in Step 220. For example, a user of the host terminal 100 requests image transmission and the host terminal 100 performs an image acquisition process in response to a user's request. For this, the host terminal 100 preferably has a conventional camera module capable of acquiring a user's image.

Next, in Step 225 the host terminal 100 creates a transmission packet of image data from the acquired image. Specifically, the host terminal 100 divides the acquired image into segments proper to be transmitted, and then compresses the divided image segments. A well known JPEG (Joint Photographic Expert Group) method is preferably used for image compression. Furthermore, the host terminal 100 creates the transmission packet of the compressed image such that a header of the transmission packet includes the IP address of the host terminal 100, i.e. a sender, and the IP address of the client terminal 500, i.e. a receiver.

Thereafter, in Step 230 the host terminal 100 transmits the transmission packet of the image data to the client terminal 500.

While receiving the transmission packet of the image data, in Step 310 the client terminal 500 determines whether the reception of the transmission packet is completed. After completing reception of the transmission packet, in Step 315 the client terminal 500 performs a predefined process on the received transmission packet to output them. For example, the client terminal 500 specifies in advance the time for receiving an image and generates output data of an image by combining the packets received during the specified time. If the received packets have image division information, the client terminal 500 decides, by using such image division information, whether all packets necessary for a single image output are completely received.

After receiving and processing the transmission packet, in Step 320 the client terminal 500 determines whether an image of the processed packet is valid. Then, the client terminal 500 displays the valid image in Step 325. If any image is non-valid, the client terminal 500 does not perform the displaying Step 325 and ignores the non-valid image. Sometimes one or more image segments may be damaged due to unexpected reasons such as abnormal communication, and such damaged segments renders an image non-valid.

Next, in Step 330 the client terminal 500 determines whether there is a request for messenger end. If the messenger end request occurs by a user or other terminals, in Step 335 the client terminal 500 ends a mobile messenger service in response to the end request. Otherwise, if there is no end request, the client terminal 500 repeats the above-discussed Steps 305 to 320.

On the other hand, after sending the transmission packet of the image data in the above-discussed Step 230, the host terminal 100 determines in Step 235 whether a predefined transmission period has passed. If the period passed, the host terminal 100 repeats the above-discussed Steps 220 to 225. Otherwise, if the period did not pass, in Step 240 the host terminal 100 waits for the period to expire. Additionally, the host terminal 100 determines in Step 245 whether there is a request for image transmission cancel during waiting. If there is a transmission cancel request, in Step 250 the host terminal 100 keeps the text transmission/reception mode to perform text transmission and reception with the client terminal 500.

Thereafter, in Step 255 the host terminal 100 determines whether there is a request for messenger end. If the messenger end request occurs by a user or other terminals, in Step 260 the host terminal 100 ends a mobile messenger service in response to the end request. Otherwise, if there is no end request, the host terminal 100 returns to the above-discussed Step 250.

As discussed above, the host terminal 100 acquires an image in response to the image transmission request at a specified period, e.g. one second, and transmits the acquired image to the client terminal 500. Moreover, this image transmission is directly accomplished between the host terminal 100 and the client terminal 500 without intervention of any server. Accordingly, each user of a mobile messenger service can look at an image of the counterpart.

Figure 4:
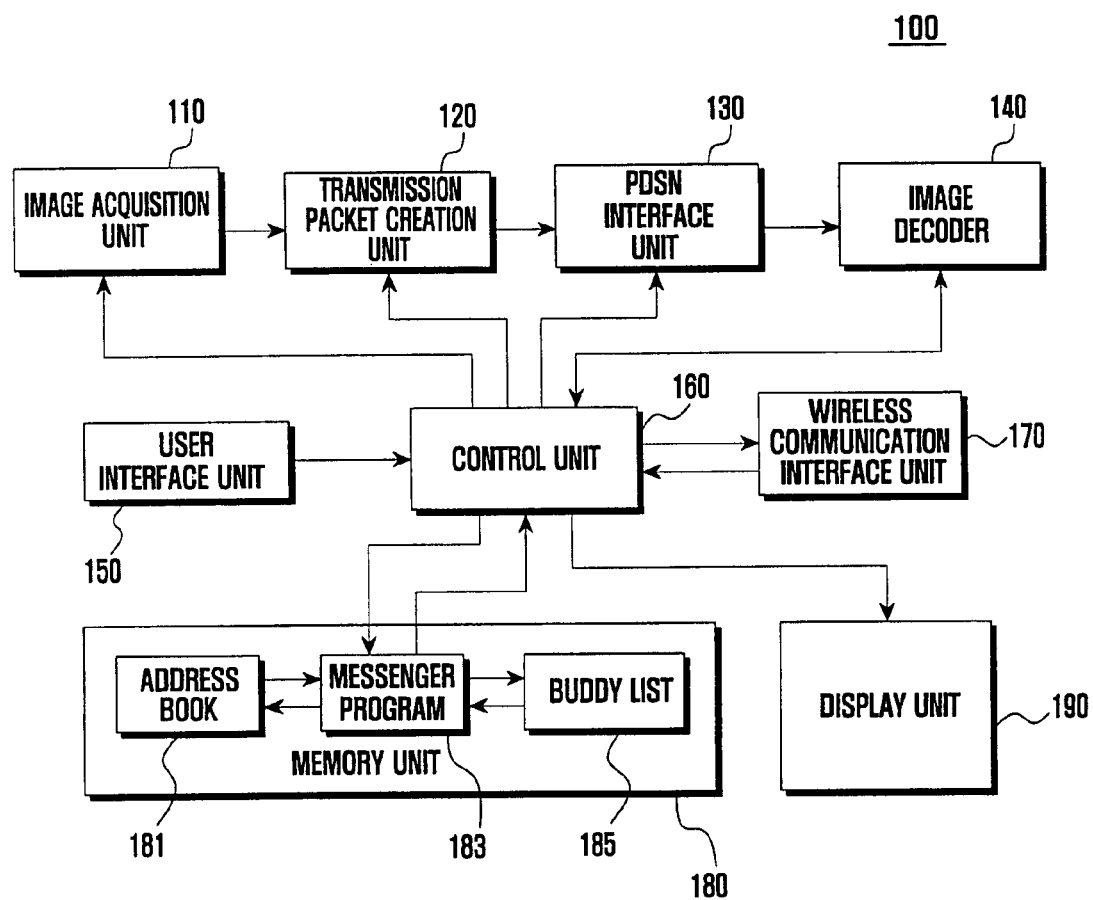
FIG. 4 is a block diagram showing a mobile communication terminal for image transmission in a mobile messenger service in accordance with an exemplary embodiment of the present invention.

FIG. 4 is a block diagram showing a mobile communication terminal for image transmission in a mobile messenger service in accordance with an exemplary embodiment of the present invention. FIG. 4 refers to the host terminal 100 shown in FIGS. 1 to 3. Since the host terminal has the substantially same configuration in structure as the client terminal, the mobile communication terminal shown in FIG. 4 can be also applied to the client terminals discussed above.

Referring to FIG. 4, the host terminal 100 includes an image acquisition unit 110, a transmission packet creation unit 120, a PDSN interface unit 130, an image decoder 140, a user interface unit 150, a control unit 160, a wireless communication interface unit 170, a memory unit 180 and a display unit 190.

The image acquisition unit 110 obtains image data. Specifically, the image acquisition unit 110 captures in real time an image of a user who is utilizing the mobile messenger service, under control of the control unit 160. For this, the image acquisition unit 110 has a camera lens configured to face toward a user. When a user looks at the display unit 190 or operates the user interface unit 150, i.e. a keypad, the camera lens in the image acquisition unit 110 faces toward a user. Therefore, the camera lens may be located at the front face of the host terminal 100 or, at least during a mobile messenger service, be adjustable in location or direction as if located at the front face.

The transmission packet creation unit 120 converts an image acquired by the image acquisition unit 110 into a proper format for transmission through the PDSN (400 in FIG. 1). For example, the transmission packet creation unit 120 divides the image into one-time transmittable segments and then compresses them by using the JPEG method. Furthermore, the transmission packet creation unit 120 creates a transmission packet of the compressed image segments such that a header of the packet includes the IP address of the host terminal 100, i.e. a sender, and the IP address of the client terminal 500, i.e. a receiver.

The PDSN interface unit 130 performs data communication with the PDSN (400 shown in FIG. 1). For example, the PDSN interface unit 130 performs data communication with the counterpart terminal, such as the client terminal (500 shown in FIG. 1), registered in the buddy list of the host terminal 100 and is using a mobile messenger service. Especially, the PDSN interface unit 130 transmits the transmission packet of image data that the transmission packet creation unit 120 creates to the client terminal designated in the packet. In addition, the PDSN interface unit 130 receives another transmission packet of image data from the client terminal in use of a mobile messenger service.

The image decoder 140 decodes the transmission packet of image data that the PDSN interface unit 130 receives. For example, the image decoder 140 decodes a JPEG compressed image contained in the transmission packet.

The user interface unit 150 offers an interface with a user to control operations of the host terminal 100. Especially, the user interface unit 150 receives a user's action for transmitting a message, e.g. an invitation message, or transmitting an image in use of a mobile messenger service, and then sends a corresponding input signal to the control unit 160.

In general, the control unit 160 controls the host terminal 100 according to input signals received from a user or by predefined operation programs. For example, when receiving a request for image transmission, the control unit 160 controls the image acquisition unit 110, the transmission packet creation unit 120 and the PDSN interface unit 130 to acquire a sender's image and transmit it to a designated terminal. Especially, the control unit 160 sends the transmission packet of image data at a specified period, e.g., at intervals of one second. The control unit 160 also preferably enables the display unit 190 to display the image being transmitted.

Additionally, the control unit 160 controls the image decoder 140 and the display unit 190 to process the transmission packet of image data received through the PDSN interface unit 130 and to display the processed image on a screen. Upon receiving the decoded image from the image decoder 140, the control unit 160 determines the validity of the decoded image and only displays a valid image. If at least one segment of the decoded image is damaged, the control unit 160 decides the damaged image to be non-valid and preferably ignores it.

The wireless communication interface unit 170 performs a normal communication through wireless communication network under control of the control unit 160. For example, the wireless communication interface unit 170 controls a traditional voice call of the host terminal 110. Furthermore, the wireless communication interface unit 170 transmits or receives the invitation message in the form of SMS through the SMS server (200 shown in FIG. 1).

The memory unit 180 stores programs and data related to operation of the host terminal 100. Especially, the memory unit 180 stores an address book 181, a messenger program 183 and a buddy list 185. The buddy list 185 is a series of persons to talk to via a mobile messenger service and is also called a conversation companion list.

The display unit 190 outputs image data in a visual manner under control of the control unit 160. For example, the display unit 190 represents an image received from a designated counterpart terminal using the mobile messenger service. The display unit 160 may include image display sections for conversation parties, a dialogue display section and a message input section.

Figure 5:
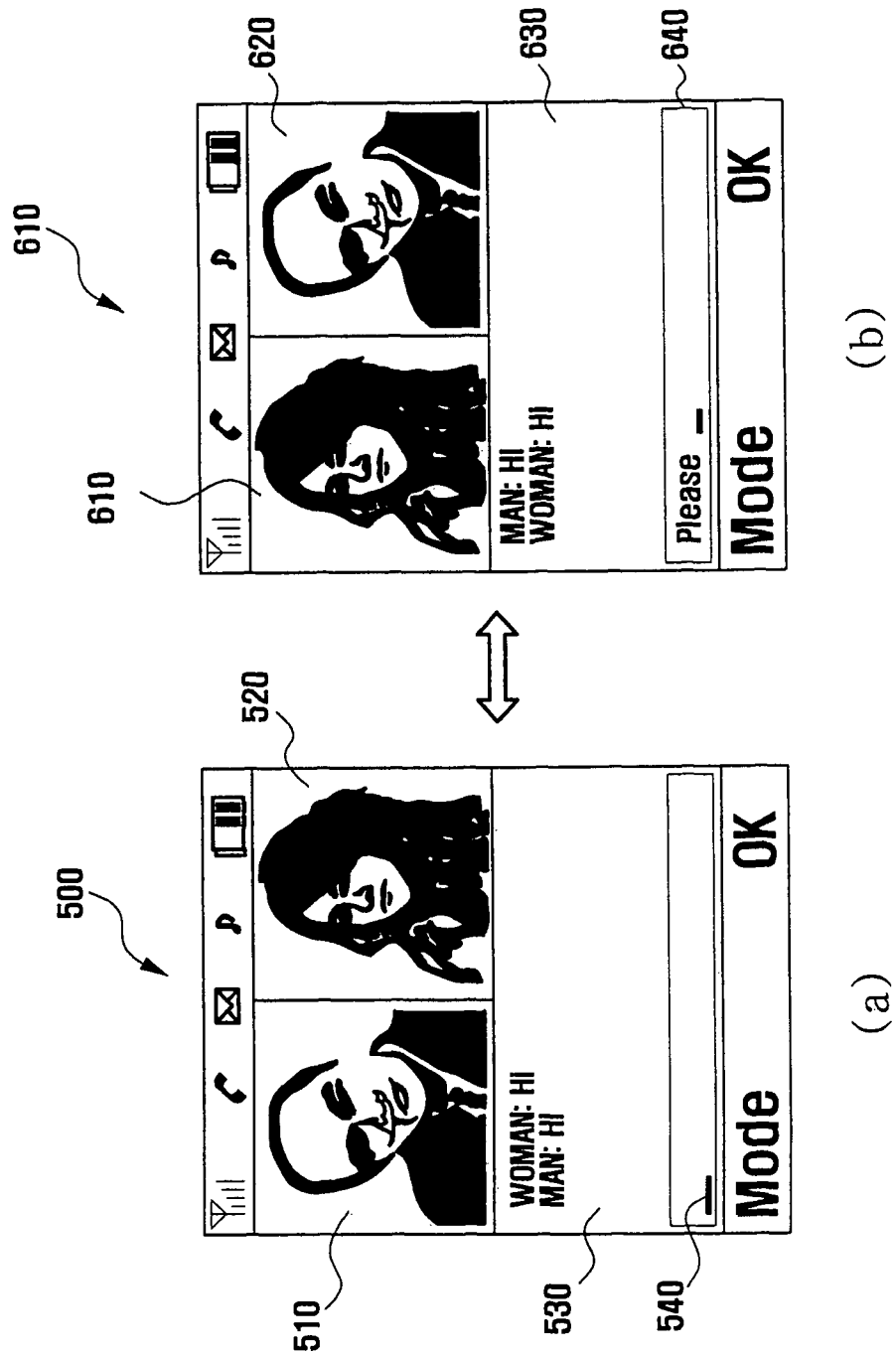
FIGS. 5(a) and (b) provide screen views showing a pair of mobile communication terminals performing a mobile messenger service in accordance with an exemplary embodiment of the present invention.

FIGS. 5(a) and (b) provide screen views showing a pair of mobile communication terminals performing a mobile messenger service in accordance with an exemplary embodiment of the present invention. FIGS. 5 (a) and (b) refer to the host terminal 100 and the client terminal 500, respectively. IN FIGS. 5(a) and 5(b), each terminal 100 and 500 has its own image display section 510 and 610, a counterpart's image display section 520 and 620, a dialogue display section 530 and 630, and a message input section 540 and 640, respectively.

Accordingly, persons using a mobile messenger service can simultaneously look at and converse with the counterpart. In an exemplary embodiment, the present invention may realize a direct transmission of compressed images between terminals without using a server in the existing CDMA network system. Since the present invention also allows periodic transmission of compressed images during a mobile messenger service, the present invention is favorable and advantageous to a relatively low speed communication network.

While this invention has been particularly shown and described with reference to exemplary embodiments thereof, it will be understood by those skilled in the art that various changes in form and details may be made therein without departing from the spirit and scope of the invention, as defined by the appended claims.

What is claimed is:

1. A mobile communication terminal for executing a mobile messenger service, the terminal comprising:
   a control unit;
   a wireless communication unit for transmitting, via a Short Message Service (SMS) server through a mobile communication network, an SMS invitation message that includes information for performing the mobile messenger service with a counterpart mobile communication terminal via a packet data communication network distinct from the mobile communication network, such that the information for performing the mobile messenger service includes information for identifying the mobile communication terminal with respect to the packet data communication network;
   a packet data communication network interface unit for providing an interface with the packet data communication network according to the information included in the SMS invitation message transmitted via the SMS server, receiving, from the counterpart mobile communication terminal, a reply to the SMS invitation message indicating acceptance of the mobile messenger service through the mobile messenger service via the packet data communication network according to the information identifying the sender of the SMS invitation message with respect to the packet data communication network included in the SMS invitation message, and sending a first transmission packet of image data to the counterpart mobile communication terminal via the packet data communication network at a specified period under control of the control unit;

an image acquisition unit for periodically obtaining the image data by determining whether a predefined transmission period for transmitting the obtained image data has elapsed, under control of the control unit in response to a request for image transmission during execution of the accepted mobile messenger service; and a transmission packet creation unit creating the first transmission packet of the image data under control of the control unit, wherein image data is obtained and a second transmission packet of the image data is created when the predefined transmission period has elapsed, and a time when the period elapses is waited for when the predefined transmission period has not elapsed.

2. The mobile communication terminal of claim 1, wherein the image acquisition unit includes a camera lens configured to be adjustable in a location or direction as if located at a front face of the terminal.

3. The mobile communication terminal of claim 1, wherein the transmission packet creation unit divides the image data into one-time transmittable segments and compresses the divided segments, and wherein the first transmission packet of the image data includes the divided and compressed image segments, an Internet Protocol (IP) address of a sender and an IP address of a receiver.

4. The mobile communication terminal of claim 3, wherein the transmission packet creation unit compresses the divided segments of the image data using a Joint Photographic Experts Group (JPEG) method.

5. The mobile communication terminal of claim 1, wherein the first transmission packet of the image data includes information about the counterpart mobile communication terminal, wherein the packet data communication interface unit sends the first transmission packet to the counterpart mobile communication terminal through the packet data communication network.

6. The mobile communication terminal of claim 1, wherein the specified period is approximately one second.

7. The mobile communication terminal of claim 1, further comprising:

an image decoder decoding the second transmission packet of image data received by the packet data communication interface unit during execution of the mobile messenger service; and a display unit displaying the decoded image data.

8. The mobile communication terminal of claim 7, wherein the display unit includes a second image display section for displaying a second packet, a dialogue display section and a message input section.

9. The mobile communication terminal of claim 8, wherein the display unit further includes a first image display section for displaying the first packet.

10. The mobile communication terminal of claim 7, wherein the control unit receives the decoded image data from the image decoder, determines validity of the decoded image data, and controls the display unit to display a valid image only.

11. A method for image transmission in execution of a mobile messenger service, the method comprising:

transmitting, via a Short Message Service (SMS) server through a mobile communication network, an SMS invitation message that includes information for performing the mobile messenger service with a counterpart mobile communication terminal via a packet data communication network distinct from the mobile communication network, such that the information for performing the mobile messenger service includes information for identifying a sender of the SMS invitation message with respect to the packet data communication network;

receiving, from the counterpart mobile communication terminal, a reply to the SMS invitation message indicating acceptance of the mobile messenger service through the mobile messenger service via the packet data communication network according to the information identifying the sender of the SMS invitation message with respect to the packet data communication network included in the SMS invitation message, acquiring image data periodically by determining whether a predefined transmission period for transmitting the obtained image data has elapsed, in response to a request for image transmission during execution of the accepted mobile messenger service;

creating a first transmission packet of the image data; and sending the first transmission packet of the image data to the counterpart mobile communication terminal via the packet data communication network according to the information included in the SMS invitation message transmitted via the SMS server at a specified period, wherein image data is obtained and a second transmission packet of the image data is created when the predefined transmission period has elapsed, and a time when the period elapses is waited for when the predefined transmission period has not elapsed.

12. The method of claim 11, wherein the creating of the first packet includes dividing the image data into one-time transmittable segments, compressing the divided segments and creating the first packet having the divided and compressed image segments, an Internet Protocol (IP) address of a sender and an IP address of a receiver.

13. The method of claim 11, wherein the sending of the first packet is performed at intervals of approximately one second.

14. The method of claim 11, further comprising:

receiving the second transmission packet of image data from the packet data communication network during execution of the mobile messenger service;

decoding the second transmission packet of the image data; and displaying the decoded image data.

15. The method of claim 14, wherein the displaying of the decoded image data includes displaying the second packet in a second image display section of a display unit also having a dialogue display section and a message input section.

16. The method of claim 15, further comprising:

displaying the first packet in a first image display section separated from the second image display section.

17. The method of claim 14, further comprising:

determining validity of the decoded image data, wherein the displaying of the decoded image data includes displaying a valid image only.

\* \* \* \* \*